3,574,852
TREATING DEPRESSION WITH THE N-OXIDE OF N-(3' - DIMETHYLAMINO PROPYL)-IMINODIBENZYL
Hjarne Dyrsting, Virum, and Jorgen Brix Pedersen, Hvidovre, Denmark, assignors to A/S Dumex (Dumex Ltd.), Copenhagen, Denmark
No Drawing. Continuation-in-part of application Ser. No. 581,729, Sept. 26, 1966, which is a continuation-in-part of application Ser. No. 267,839, Mar. 25, 1963. This application Aug. 11, 1969, Ser. No. 849,215
Claims priority, application Great Britain, Mar. 27, 1962, 11,680/62; Feb. 5, 1963, 4,670/63
Int. Cl. A61k 27/00
U.S. Cl. 424—330
5 Claims

ABSTRACT OF THE DISCLOSURE

The compound, N-oxide of N-(3'-dimethylaminopropyl)-iminodibenzyl and the pharmaceutically acceptable, non-toxic acid addition salts thereof possessing antidepressant activity and reduced untoward side effects, and which may be administered to animals for such purposes.

---

This application is a continuation-in-part of a previously filed application, Ser. No. 581,729, filed Sept. 26, 1966, which in turn is a continuation-in-part of previously filed application Ser. No. 267,839, filed Mar. 25, 1963, and both are now abandoned.

More particularly, the invention relates to the N-oxide of N-(3'-dimethylaminopropyl)-iminodibenzyl, and to acid-addition salts thereof with pharmaceutically acceptable, innocuous acids.

In animal experiments, the said N-oxide and its salts have proved able to prevent the depression and increased parasympathetic activity experimentally produced by means of reserpine, and have also shown good results clinically in the treatment of endogen depressions. The therapeutic effect equals the best results obtained with the known parent compound imipramine, N-(3'-dimethylaminopropyl)-iminodibenzyl, without the undesired side effects of the latter.

In one method of preparing the N-oxide of the invention, iminodibenzyl is condensed with 3-dimethylaminepropyl chloride, in which N-oxidation is carried out before or after the condensation.

In another method, N-(3'-bromopropyl)-iminodibenzyl is reacted with dimethylhydroxylamine to produce the desired N-oxide, which is precipitated from the reaction mixture, and transferred into a salt, if desired.

The N-oxide as the free base forms white needle-shaped crystals, melting at 120–123° C. under decomposition, and being soluble in the common organic solvents such as methanol, ether, acetone and benzene.

In the therapeutical application, the free base as well as the acid-addition salts with pharmaceutically acceptable acids may be used. Particularly suited is the hydrochloride salts, which can be obtained, for example, by dissolving the free base in acetone, and introducing dry hydrogen chloride whereby the salt is precipitated as white crystals melting at 153–155° C. under decomposition.

The hydrochloride has been used for determining the toxicity. By intraperitoneal injection on rats it was found that the $LD_{50}$, i.e., the dose killing 50% of the test animals by a single injection, was 90 mg./kg., whereas a corresponding experiment with mice gave an $LD_{50}$ of 150 mg./kg. By administration to rats by means of a stomach tube, it was surprisingly found that the $LD_{50}$ was as high as 930 mg./kg., which is particularly interesting when considering that oral administration is generally preferred clinically.

The toxicity on injection is almost equal to that of imipramine whereas in oral administration, the $LD_{50}$ of the latter was found to be only 330 mg./kg., or almost three times as toxic as the N-oxide.

The compounds of this invention may be administered to the animal being treated either orally or parenterally in the treatment of those conditions requiring antidepressant agents, and for such purposes may be incorporated in final therapeutic dosage compositions useful for such purposes. Most preferably, the compounds of this invention may be administered orally and may for such purposes be incorporated in final dosage compositions.

The final therapeutic dosage compositions of this invention comprise as their active component the N-oxide of N-(3'-dimethylaminopropyl)-iminodibenzyl or the pharmaceutically acceptable, non-toxic acid addition salt thereof, admixed with a pharmaceutical vehicle suitable for the intended route of administration to the patient being treated. Thus, final therapeutic dosage compositions suitable for oral administration may be prepared by admixture of the active compounds of this invention with such well recognized orally acceptable pharmaceutical carriers as milk sugar, starch, talc and the like, the amount of the active compound employed being determined according to the patient and his condition. These admixtures may then be converted into the required final oral dosage form, e.g., tablets, capsules, elixirs and the like, as is well known in the art. In the case of final dosage compositions desired for parenteral administration the active compounds may be admixed with such parenterally acceptable pharmaceutical vehicles as water, vegetable oil, propylene glycol and the like, and thereafter these admixtures may be filled into suitable containers or package forms, e.g., ampules or vials for later use, as is generally recognized in the art.

In a clinical experiment, 22 patients suffering from endogenous depression were treated daily for 2–4 weeks with 120–200 mg. of the hydrochloride of the present N-oxide. In 11 of these patients, full remission was observed, and in 6 of the others a substantial improvement was observed. In the remaining 5 patients no clear improvement could be observed. No or only insignificant secondary effects were observed. In a few cases, difficulties in falling into sleep were noted, but could be avoided by administering the daily doses not later than 3–4 hours before bedtime. A little dryness in the throat could possibly be due to the drug.

In a corresponding experiment, reported in the Canadian Psychiatric Association Journal, vol. 3, pages 155–164, treatment of endogenous depression with imipramine itself in doses from 100 mg. to 600 mg. daily, about three quarters of the cases were judged recovered or much improved. However, since the side effects increased rapidly, when the daily dose exceeded 200 mg., it was recommended to keep below said dose (page 159).

It is further reported that a variety of side effects was encountered in about one-third of all patients treated, cardiovascular and vasomotor symptoms being the most frequent (page 160). This is probably due to the pronounced spasmolytic effect of imipramine, affecting the parasympathetic nerve system. The present N-oxide is practically without spasmolytic effect, as appears from the following Table I, where the spasmolytic effect of 2-dimethyl-aminoethyl-benzhydryl ether, a well-known spasmolytic agent, is used as a unit.

TABLE I

|  | Spasmolytic effect against spasms produced by— | | | |
| --- | --- | --- | --- | --- |
|  | Acetyl-choline | Hista-mine | Seroto-nine | Barium chloride |
| 2-dimethylaminoethyl-benzhydryl ether | 1 | 1 | 1 | 1 |
| Imipramine hydrochloride | 1.8 | 0.9 | 2.9 | 2.5 |
| N-oxide of imipramine hydrochloride | 0.035 | 0.01 | 0.034 | 0.08 |

The spasmolytic effect of the present N-oxide in spasms produced in particular by acetylcholine is seen to be exceedingly feeble, and since acetylcholine is the chemical transmitter in the parasympathetic nerve system, the latter is not influenced by administration of the N-oxide.

The imipramine further has a pupil dilating effect not found in the N-oxide, as appears from Table II below, showing pupil dilation in mice after intraperitoneal injection.

TABLE II

|  | Diameter of pupil | |
| --- | --- | --- |
|  | Before injection, mm. | After injection, mm. |
| Imipramine hydrochloride | 0.29 | 0.48 |
| Imipramine-N-oxide hydrochloride | 0.23 | 0.24 |

The effect on the arterial blood pressure after intravenous injection in rabbits appears from the following Table III.

TABLE III

|  | Dosage, mg./kg. | Decrease of arterial blood pressure in mm. Hg |
| --- | --- | --- |
| Imipramine hydrochloride | 0.1 | 20-30 |
| Imipramine-N-oxide hydrochloride | 1.0 | 0 |

Similarly, the artificial increase of blood pressure observed after intravenous injection of adrenalin or noradrenalin in rabbits is strongly or completely reduced by injection of 1 mg. of imipramine hydrochloride, whereas no reduction is observed after injecting 4 mg. of imipramine-N-oxide hydrochloride.

Electrocardiographic measurements with rabbits as test animals showed no or only very small changes on injecting up to 3 mg./kg. imipramine-N-oxide hydrochloride, whereas changes were noted on injecting 0.3 mg./kg. of imipramine hydrochloride, the changes being accentuated in accordance with increases of the said dose.

These tests prove that the N-oxide has considerably less vegetative effects than imipramine itself, corresponding to the fewer side effects noted in the clinical trials.

The following examples are illustrative of the preferred methods of producing the compounds of the invention.

EXAMPLE 1

31.6 g. (0.1 mole) of the hydrochloride of N-(3'-dimethylaminopropyl)-iminodibenzyl—produced in known manner by reacting iminodibenzyl with 3-dimethylaminopropyl-chloride—are dissolved in water, and the solution is made alkaline by the addition of 28% aqueous solution of sodium hydroxide. The liberated base is extracted with ether, and the ether evaporated. The residue is dissolved in 100 ml. of methanol, and 31 ml. of 30% hydrogen peroxide are added. After 7 days, the reaction mixture is diluted with 200 ml. of water and evaporated in vacuum. The precipitated crystals are filtered off by suction, washed with water, and dried. The yield is 28 g. of the N-oxide of N-(3'-dimethylaminopropyl)-iminodibenzyl as the free base.

By dissolving the free base in acetone, and precipitating with dry hydrogen chloride, a hydrogen chloride salt is obtained, melting at 153.2–155.2° C. under decomposition.

EXAMPLE 2

Step A: 12.2 g. of 3-dimethylaminopropyl chloride are dissolved in 100 ml. of methanol, and 31 ml. of 30% hydrogen peroxide are added while shaking. The reaction mixture is left for 2 days, and then the surplus of hydrogen peroxide is destroyed by means of palladium. After filtration, the solution is evaporated in vacuum, and the residue is dissolved in 50 ml. of dimethyl formamide.

Step B: 19.5 g. of iminodibenzyl are dissolved in 100 ml. of dimethyl formamide and 5 g. of sodium amide are added. After heating to 60° C. and stirring for 2 hours, the solution prepared in Step A is added dropwise, and then the mixture is stirred for a further 7 hours at 60° C. After filtration, the solution is evaporated in vacuum, the residue is dissolved in acetone, and hydrogen chloride dissolved in isopropanol is added to pH 4.5. Thereby, the hydrogen chloride derivative of the N-oxide of N-(3'-dimethylaminopropyl)-iminodibenzyl is precipitated. The salt is filtered off by suction, and dried. The yield is about 70%, and the melting point is 153.1–155.0° C. under decomposition.

EXAMPLE 3

34.6 g. (0.1 mole) of N-(3'-bromopropyl)-iminodibenzyl produced in a manner known per se from iminodibenzyl, 7.3 g. of dimethylhydroxyamine and 14 g. of potassium carbonate were refluxed in 100 ml. of acetone for 8 hours. The reaction mixture was then filtered in the hot state, and cooled, whereby a precipitate of the N-oxide of N-(3'-dimethylaminopropyl)-iminodibenzyl as the free base was formed, which was filtered off, and recrystallized from acetone.

The free base was transformed into the hydrochloride salt by dissolving in acetone and precipitating with hydrogen chloride, yielding 22–24 g. of white crystals with M.P. 153.2–155.2° C.

EXAMPLE 4

The antidepressant effect of imipramine-N-oxide and of imipramine was compared in a clinical trial. Over a period of six months every other patient in need of antidepressant therapy was put on imipramine-N-oxide and the other patients on imipramine. The treatment was discontinued at the end of three weeks, if there was no distinct improvement of the depression. The clincal condition was assessed twice weekly, and all objective as well as subjective side effects were recorded. The final evaluation of the preparations was performed after the treatment had been completed, or at the latest when the patient was discharged.

Each drug was administered to 25 patients. The sex ratio and age distribution were approximately the same in both groups. Only five patients were above 60 years of age. In both groups half the number of patients had a duration of illness of less than six months. Table IV gives the distribution of the various diagnoses in both groups.

TABLE IV

|  | Treatment | |
| --- | --- | --- |
| Diagnosis | Imipramine-N-oxide | Imipramine |
| Neurotic depressions | 18 | 18 |
| Endogenous depressions | 4 | 2 |
| Schizo-affective psychoses | 1 | 2 |
| Senile depressions | 2 | 3 |
| Total | 25 | 25 |

The drugs were used in the form of 25 mg. tablets. In both groups the initial dose was 25 mg. three times daily, increased by 25 mg. every day—in elderly patients every other day—until the optimum dose was attained or until subjective side effects occurred. The optimum dose of imipramine-N-oxide was lower than that of imipramine. Thus, the majority of the patients in the imipramine group received 175–200 mg. as the maximum daily dose, while most of the imipramine-N-oxide patients received a maximum daily dose of 125–150 mg. The treatment period ranged from 3 to 14 weeks.

No other antidepressants or anticonvulsants were given at the same time but most of the patients received moderate doses of chlordiazepoxide or diasepam as a supplement. One patient received perphenazine and another one prochlorperazine maleate together with imipramine-N-oxide without any untoward effects.

Table V shows that in both experimental groups three-quarters of the patients obtained satisfactory improvement, but that full remission was relatively more common in the imipramine-N-oxide group. Patients were considered improved when they had only residual symptoms so mild that they could be discharged on continued medication with out-patient control.

TABLE V

| Compound | Considerable improvement until remission | Improvement good | Unchanged | Taken out of trial | Response, percent |
|---|---|---|---|---|---|
| Imipramine-N-oxide | 11 | 7 | 5 | 2 | 78 |
| Imipramine | 7 | 10 | 6 | 2 | 74 |

In 15 cases of the imipramine group and 12 of the imipramine-N-oxide group, subjective side effects were recorded, and are set forth in Table VI, below:

TABLE VI

| Side effects | Imipramine-N-oxide | Imipramine |
|---|---|---|
| Dry mouth | 4 | 8 |
| Dysuria | 2 | 3 |
| Dizziness | 3 | 7 |
| Tremor | 1 | 1 |
| Fatigue | 0 | 2 |
| Accommodation difficulties | 0 | 3 |
| Number of side effects | 10 | 24 |

The foregoing clinical trial and the results obtained therein clearly demonstrate the superior efficacy of the imipramine-N-oxide compound of this invention and the substantial reduction of untoward side effects thereof when compared with imipramine.

What is claimed is:

1. A composition for the treatment of animals suffering from depression, which composition comprises as an active ingredients thereof a depressant treating amount of the compound, N-oxide of N - (3' - dimethylaminopropyl)-iminodibenzyl or a pharmaceutically acceptable non-toxic acid addition salt thereof, admixed with a pharmaceutically acceptable vehicle suitable for oral or parenteral administration to the animal being treated.

2. In the method of treating states of depression in animals, the improvement which consists of the step of administering, orally or parenterally, to said animal a depressant treating amount of the compound N-oxide of N-(3'-dimethylaminopropyl)-iminodibenzyl or a pharmaceutically acceptable non-toxic acid addition salt thereof.

3. In the method of claim 2 wherein said compound is the N-oxide N-(3'-dimethylaminopropyl)-iminodibenzyl.

4. In the method of claim 2 wherein said compound is the hydrochloride salt of the N-oxide of N-(3'-dimethylaminopropyl)-iminodibenzyl.

5. A method for the treatment of animals suffering from depression which comprises administering, either orally or parenterally, to an animal a depressant treating amount of the N-oxide of N-(3'-dimethylaminopropyl) - iminodibenzyl or a pharmaceutically acceptable non-toxic salt thereof, said treatment accomplished with a substantial reduction of untoward side effects for the animal being treated.

References Cited

UNITED STATES PATENTS

| 2,500,131 | 3/1950 | Linsker | 260—7Q. |
| 2,518,130 | 8/1950 | Evans et al. | 260—EQ. |
| 2,554,736 | 5/1951 | Haefliger et al. | 260—239B |

OTHER REFERENCES

Culvenor, Reviews Pure and Applied Chem., vol. 3, p. 86 (1953).

Lehmann et al., Can. Psychiatric Assn. Journal, vol. 3, pp. 155–164 (1958).

STANLEY J. FRIEDMAN, Primary Examiner

U.S. Cl. X.R.

260—239